(12) United States Patent
Oka et al.

(10) Patent No.: US 11,471,779 B2
(45) Date of Patent: Oct. 18, 2022

(54) SPECTATING SUPPORT APPARATUS, SPECTATING SUPPORT METHOD, AND SPECTATING SUPPORT PROGRAM

(71) Applicant: JVCKENWOOD Corporation, Yokohama (JP)

(72) Inventors: Hisashi Oka, Yokohama (JP); Hideki Aiba, Yokohama (JP); Yuya Takehara, Yokohama (JP); Ryouji Hoshi, Yokohama (JP); Shingo Kida, Yokohama (JP); Yincheng Yang, Yokohama (JP); Hideya Tsujii, Yokohama (JP); Daisuke Hachiri, Yokohama (JP); Ryotaro Futamura, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 0 days.

(21) Appl. No.: 17/195,964

(22) Filed: Mar. 9, 2021

(65) Prior Publication Data
US 2021/0275930 A1 Sep. 9, 2021

(30) Foreign Application Priority Data
Mar. 9, 2020 (JP) .............................. JP2020-039943

(51) Int. Cl.
*A63F 13/25* (2014.01)
*A63F 13/86* (2014.01)
*A63F 13/525* (2014.01)

(52) U.S. Cl.
CPC ............ *A63F 13/86* (2014.09); *A63F 13/525* (2014.09)

(58) Field of Classification Search
CPC ........ A63F 13/25; A63F 13/40; A63F 13/426; A63F 13/537; A63F 13/5372; A63F 13/86; A63F 2300/577
See application file for complete search history.

(56) References Cited

U.S. PATENT DOCUMENTS

| | | | |
|---|---|---|---|
| 2011/0107220 A1* | 5/2011 | Perlman | H04N 19/166 715/720 |
| 2017/0001112 A1* | 1/2017 | Gilmore | A63F 13/40 |
| 2020/0289934 A1* | 9/2020 | Azmandian | A63F 13/428 |

FOREIGN PATENT DOCUMENTS

| | | |
|---|---|---|
| JP | 2018-520772 A | 8/2018 |
| JP | 2019-74789 A | 5/2019 |

* cited by examiner

*Primary Examiner* — Omkar A Deodhar
(74) *Attorney, Agent, or Firm* — Brundidge & Stanger, P.C.

(57) ABSTRACT

A map data analysis unit refers to map data for a game in which a plurality of players compete in a three-dimensional space to extract positional information on each player. A feature parameter extraction unit extracts a feature parameter related to the game. A spectating area analysis unit analyzes one or more areas in a map that should be viewed by spectators, based on the positional information on each player and the feature parameter related to the game. A map data generation unit generates spectating map data by associating information indicating the area that should be viewed by spectators with the map data.

18 Claims, 6 Drawing Sheets

SPECTATING SUPPORT APPARATUS, SPECTATING SUPPORT METHOD, AND SPECTATING SUPPORT PROGRAM

BACKGROUND OF THE INVENTION

1. Field of the Invention

The present invention relates to spectating support technology for supporting spectating of games.

2. Description of the Related Art

Recently, electronic sports (e-sports) have become popular all over the world, and video game tournaments of various genres are being held. Other than by actually participating in a game to play, video games can be enjoyed, like any other sports, by viewing other players playing the game without participating in the game. Recently, individuals are actively broadcasting movies on Internet social sites. In e-sports, too, there are attempts to broadcast the player's play. Spectators view delivered movies by viewing a video game tournament live or viewing an archived past tournament.

Patent literature 1 discloses a content delivery system for delivering content provided by a provider user to user terminals of viewer users in a manner that user experience is enriched by using functions for originating texts and images. Patent Literature 2 discloses a spectating system in which game meta data is acquired from the game system of the game being broadcast, and content for broadcast is generated and delivered based on the game meta data.

[Patent Literature 1] JP2019-74789
[Patent Literature 2] JP2018-520772

One of esports genres is a shooting game called First Person Shooter (FPS)/Third Person Shooter (TPS), in which a player sees a virtual world in the game and moves within the space for a battle in a first-person/third-person perspective. The basic rule is to manipulate an in-game avatar and defeat an opponent with a weapon such as a handheld gun. The game may not be played by avatars. Games in which a moving objects such as a vehicle, ship, airplane, etc. is manipulated for a battle may be included.

Where there are a large number of player perspectives or spectator perspectives, a spectator viewing FPS/TPS may feel puzzled which perspective should be used to view the game and may miss a "must-see scene" in the game, although this depends on the number of participants in the competitive game.

SUMMARY OF THE INVENTION

The present invention addresses the above-described issue, and a general purpose thereof is to provide spectating support technology for supporting viewing of games in which a plurality of players compete in a three-dimensional space.

A spectating support apparatus (100) according to an embodiment of the present invention includes: a map data analysis unit (30) that refers to map data for a game in which a plurality of players compete in a three-dimensional space to extract positional information on each player; a feature parameter extraction unit (40) that extracts a feature parameter related to the game; a spectating area analysis unit (50) that analyzes one or more areas in a map that should be viewed by spectators, based on the positional information on each player and the feature parameter related to the game; and a map data generation unit (10) that generates spectating map data by associating information indicating the area that should be viewed by spectators with the map data.

Another embodiment of the present invention relates to a spectating support method. The method includes: referring to map data for refers to map data for a game in which a plurality of players compete in a three-dimensional space to extract positional information on each player; extracting a feature parameter related to the game; analyzing one or more areas in a map that should be viewed by spectators, based on the positional information on each player and the feature parameter related to the game; and generating spectating map data by associating information indicating the area that should be viewed by spectators with the map data.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
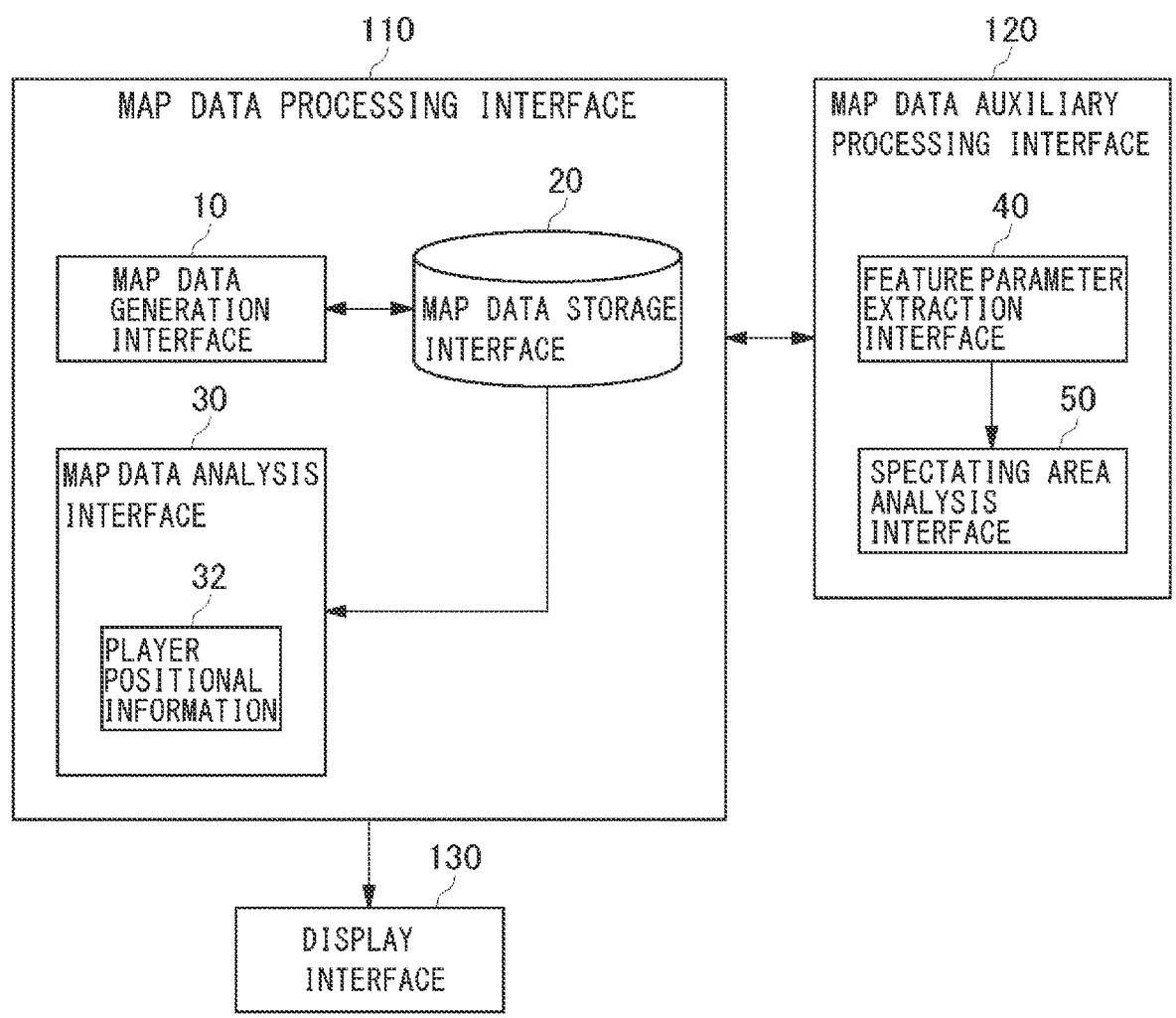
FIG. 1 shows a configuration of a spectating support apparatus according to an embodiment of the present invention.

FIG. 1 shows a configuration of a spectating support apparatus 100 according to an embodiment of the present invention. The spectating support apparatus 100 includes a map data processing unit 110 and a map data auxiliary processing unit 120.

The map data processing unit 110 generates and analyzes map data. The map data processing unit 110 includes a map data generation unit 10, a map data storage unit 20, and a map data analysis unit 30.

The map data storage unit 20 stores map data for a game in which a plurality of players compete in a three-dimensional space.

The map data generation unit 10 reads the map data stored in the map data storage unit 20, generates map data derived from appending auxiliary information to the map data by using analysis data, and writes the map data to which the auxiliary information is appended to the map data storage unit 20.

The map data analysis unit 30 refers to the map data saved in the map data storage unit 20 to extract player positional information 32 and set various parameters.

The map data auxiliary processing unit 120 appends an auxiliary function to the map data. The map data auxiliary processing unit 120 includes a feature parameter extraction unit 40 and a spectating area analysis unit 50.

The feature parameter extraction unit 40 extracts feature parameters related to the game. Feature parameters related to the game include a feature parameter of a player in the game or that of a spectator.

The spectating area analysis unit 50 analyzes one or more areas that should be viewed by spectators based on the positional information on each player and the feature parameters related to the game. One or more areas, for which the overall evaluation score of a plurality of feature parameters weighted by predetermined weights exceeds a threshold value, may be determined to be a spectating area. Alternatively, one or more areas for which a feature parameter exceeds a threshold value may be determined to be a spectating area with respect to the feature parameter.

The map data processing unit 110 and the map data auxiliary processing unit 120 exchange data mutually.

The map data generation unit 10 acquires information indicating the area that should be viewed by spectators from the spectating area analysis unit 50, generates spectating map data by associating the information indicating the area that should be viewed by spectators with the map data, and saves the spectating map data in the map data storage unit 20.

The display unit 130 presents the area that should be viewed by spectators to the spectator, based on the spectating map data. More specifically, the display unit 130 displays, by way of one example, a heat map on a map to show the area that should be viewed by spectators, based on the spectating map data. Alternatively, the display unit 130 displays a list of thumbnail images of a game scene as viewed from the perspectives of a plurality of players or spectators, based on the spectating map data, and highlights a thumbnail image that includes the area that should be viewed by spectators. The map data generation unit 10 may generate data for a heat map or for a highlighted thumbnail image, based on the spectating map data, and save the data in the map data storage unit 20. In this case, the map data processing unit 110 may cause the display unit 130 to display the heat map or the highlighted thumbnail image, based on the data saved in the map data storage unit 20.

A description will now be given of the feature parameter related to the game. The spectating support apparatus 100 according to this embodiment provides an auxiliary function that helps a spectator or a commentator know the battle situation easily in a competitive game such as FPS/TPS. For this purpose, it is necessary to analyze the battler situation using in-game parameters and convey the battle situation and present a must-see scene to the spectator or the commentator in some form.

A must-see scene in a competitive game like FPS/TPS is a battle and tactics involved. A feature parameter is extracted to forecast whether a battle is about to take place in advance. The positional information on the player and the feature parameter make it possible to indirectly analyze where a battle is about to take place, whether a battle has already taken place, or how heavy the battle is.

Examples of feature parameters will be listed below.
Player-to-player distance
Player concentration in the area
Type, count, consumption of main/sub weapons used in the battle scene
Star player
Some players have an excellent battle record. Other players have a lot of fans or followers. There are many spectators who want to see these star players are doing.
Number of spectators in player perspective/spectator perspective
A camera perspective used by a large number of spectators is generally considered to indicate that the spectator feels a must-see scene is taking place.
Players approximating a game-over condition
A battle of a player approximating game over (e.g., a player who has reduced physical power and striking power and is likely to be killed by a strike by an opponent) is often a must-see scene.
Player outside an effective area
Depending on the regulation of the game, the game area may be narrowed to promote the progress of the game when the number of battlers is reduced or to prevent the game from progressing without any battles taking place. In that case, the game may be over for a player outside an effective area unless a prescribed condition is met. A battle of such a player outside an effective area may sometimes be a must-see scene.
Player engaged in a special play
Some players broadcasting a video may play games with their actions/capabilities restricted on their own within the regulation of the game (for example, play the game without main facilities, without sub-facilities, or without full facilities, or in a restricted play mode with various constraints, etc.) and broadcast the situation of the brave battle. Such a player engaged in a special play is also dealt with as a parameter.

A description will now be given of an exemplary on-screen display on the display unit 130.

Figure 2:
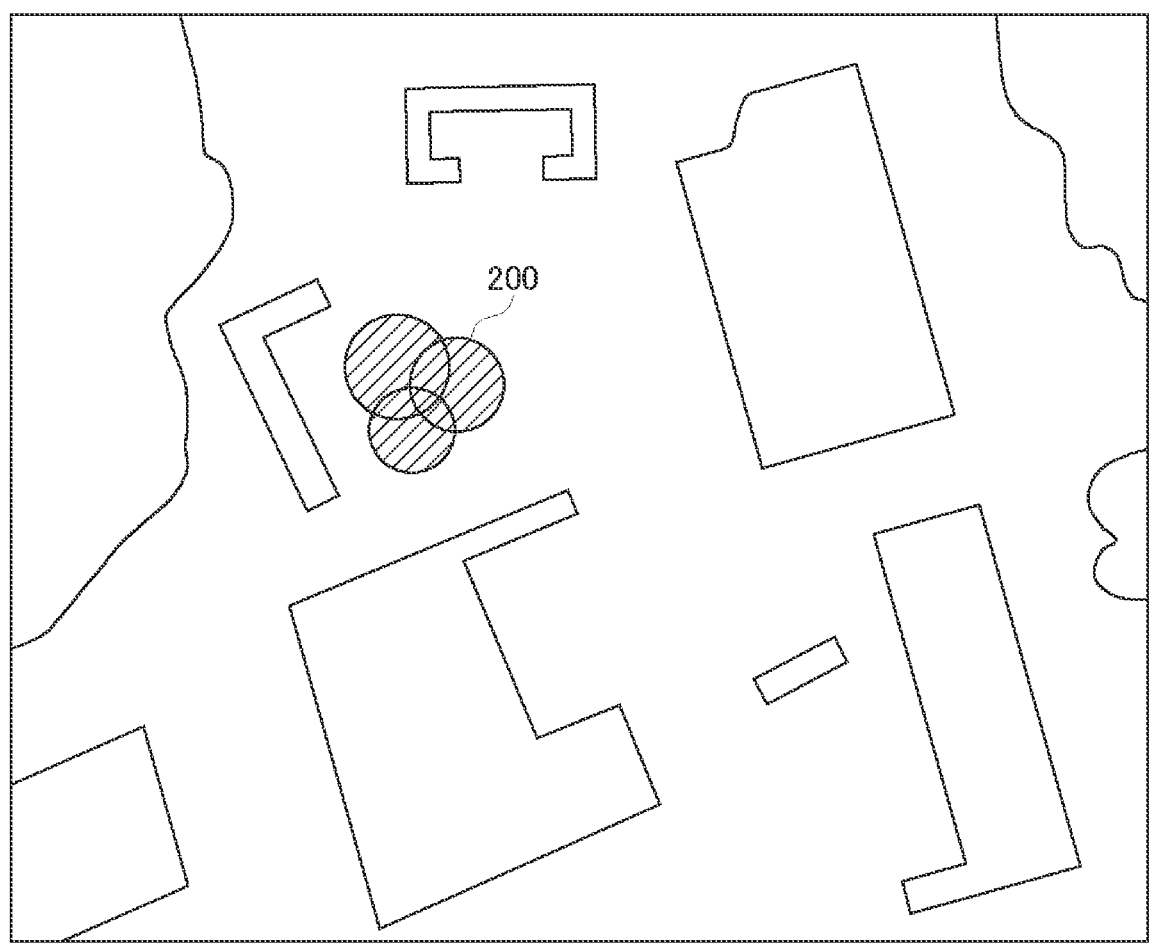
FIG. 2 shows a heat map displayed on the display unit of FIG. 1.

FIG. 2 shows a heat map displayed on the display unit 130. The area that should be viewed by spectators is displayed as a hot area 200 in the map of the game. By selecting the hot area 200, the spectator can move the camera perspective to that position to view the game.

Auxiliary coloring in the map like this helps know the battle situation. In this case, the map may simply be presented as "must-see" or presented as a map showing a feature parameter itself. The auxiliary map data in a heat map format may be displayed superimposed on the original map data or displayed separately from the map data. In this example, a location of battle will be shown if the heat map shows the weapon consumption. In the case of the positional information on a star player, for example, the map will show that players with good battle records or players spectators would like to view are concentrated in a certain area. Further, by using a plurality of feature parameters instead of a single feature parameter, the auxiliary map data will contain a larger volume of information.

Figure 3:
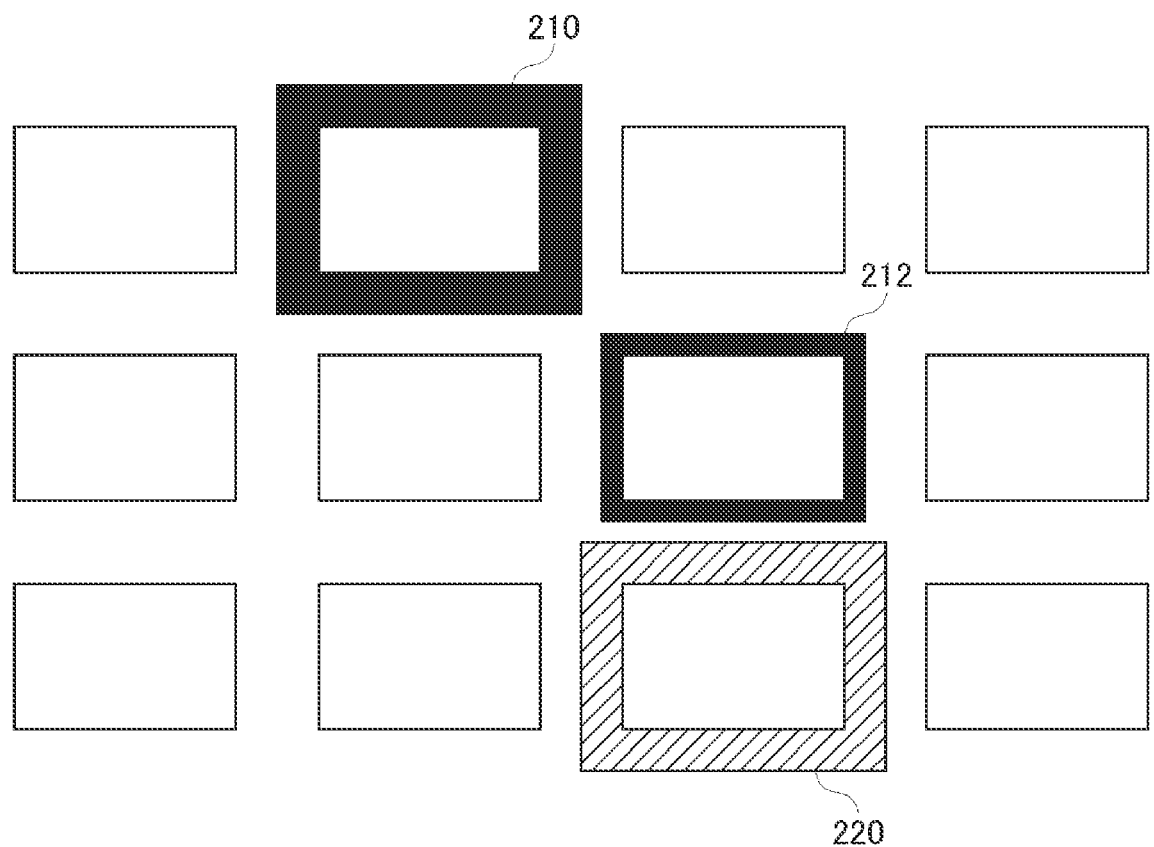
FIG. 3 shows a plurality of thumbnail movies displayed in a list on the display unit of FIG. 1.

FIG. 3 shows a plurality of thumbnail movies displayed in a list on the display unit 130. The extracted feature parameter is used to display thumbnail movies in a plurality of camera perspectives in a list such that a perspective viewing a current "must-see" scene is highlighted intuitively. Unlike the heat map of FIG. 2, the list of thumbnails of FIG. 3 does not show which area in the map a must-see scene is located. However, the spectator can select a "must-see" perspective from a plurality of perspectives without seeing the area map. When a thumbnail movie suggested as a must-see scene is selected, the camera perspective moves to that selected perspective and the spectator can view the game.

The plurality of camera perspectives may be a plurality of player perspectives, a plurality of spectator perspectives, or a plurality of perspectives of the same spectator.

Depending on the aforementioned feature parameter, the thumbnail movie of a hot perspective is highlighted by, for example, coloring the thumbnail movie or bounding the thumbnail movie by a colored frame in order to show which perspective is a hot perspective. In the example of FIG. 3, the thumbnail image of the hottest perspective is highlighted by being bounded by a bold frame 210, and the thumbnail image of the second hottest perspective is highlighted by being bounded by a thin frame 212.

The frame may be colored to show which feature parameter is used for evaluation to determine a must-see scene. For example, thumbnails may be highlighted such that a perspective of a must-see scene evaluated according to weapon consumption is indicated by a red frame 210, and a perspective of a must-see scene evaluated according to whether a star player is located is indicated by a gold frame 220. The spectator may designate a parameter for which the result desired to be seen is evaluated.

The thumbnail movies displayed in a list may be thumbnail movies from a multi-perspective camera. Alternatively, they may be a plurality of thumbnail movies that result from splitting a camera movie of a given perspective in a temporal direction, the plurality of thumbnail movies being from the same perspective but from different time zones. The thumbnail movies displayed in a list may not necessarily be movies but still images. A plurality of still images may be sequentially switched for display.

Figure 4:
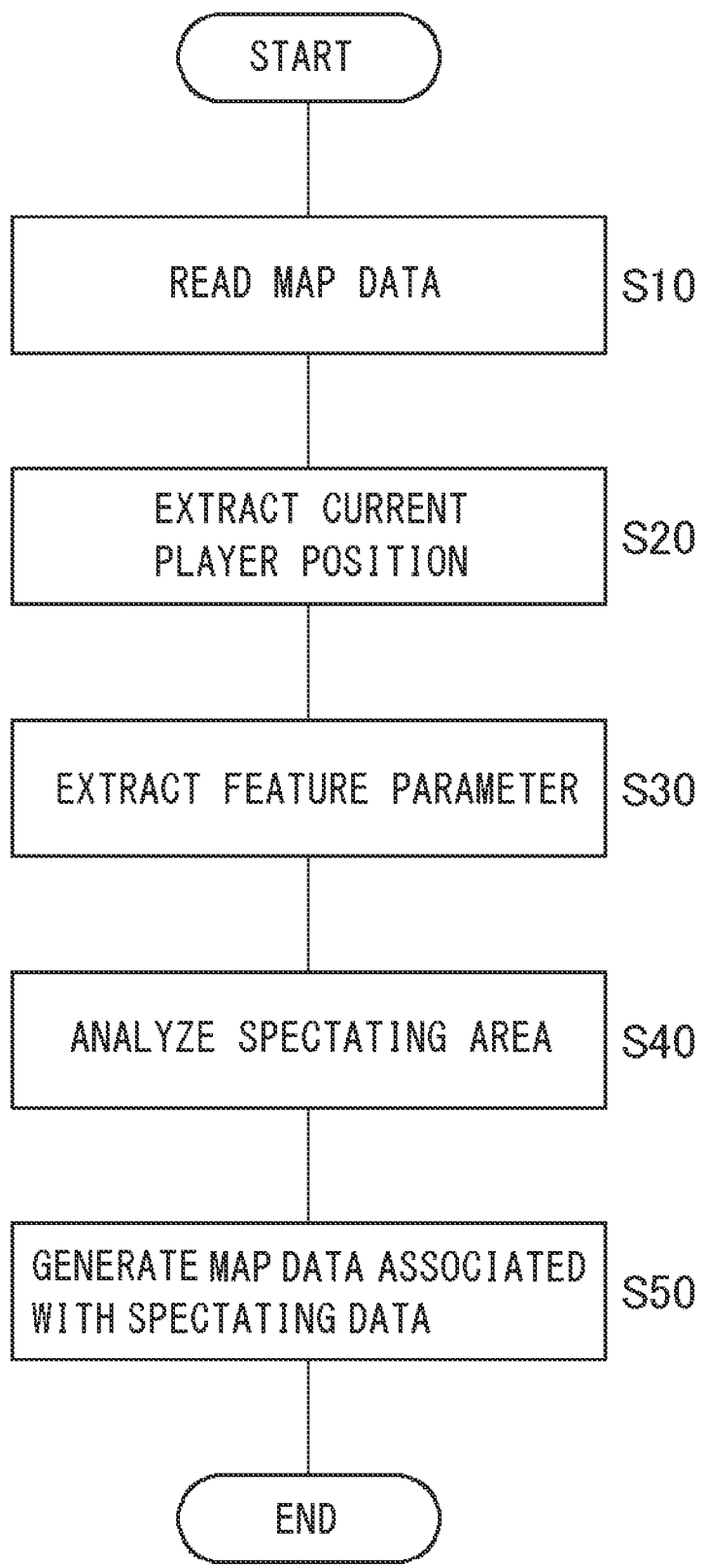
FIG. 4 is a flowchart showing a sequence of steps performed by the spectating support apparatus of FIG. 1 to generate map data.

FIG. 4 is a flowchart showing a sequence of steps performed by the spectating support apparatus 100 to generate map data.

The map data generation unit 10 reads map data from the map data storage unit 20 to gain the knowledge of the game area (S10).

The map data analysis unit 30 extracts the current position of the player's character moving in the map data (S20).

The feature parameter extraction unit 40 extracts feature parameters related to the battle situation in the game in the map (S30).

The spectating area analysis unit 50 analyzes the extracted feature parameters and identifies a spectating area in which a battle is likely to take place or a battle is already taking place, based on the player position and the analyzed feature parameter (S40).

The map data generation unit 10 generates spectating map data with an auxiliar function by generating map data to which the spectating area is appended as auxiliary information. The map data generation unit 10 saves the resultant data in the map data storage unit 20 (S50).

The method of generating spectating map data according to this embodiment is equally applicable to live broadcasting of a video of a game played in real time and to archive delivery of a recorded video of a game played in the past. An embodiment of a method of using a feature parameter in a spectating support method according to the embodiment for live broadcasting and an embodiment of a method of using a feature parameter in a spectating support method according to the embodiment for archive delivery will be explained below.

Figure 5:
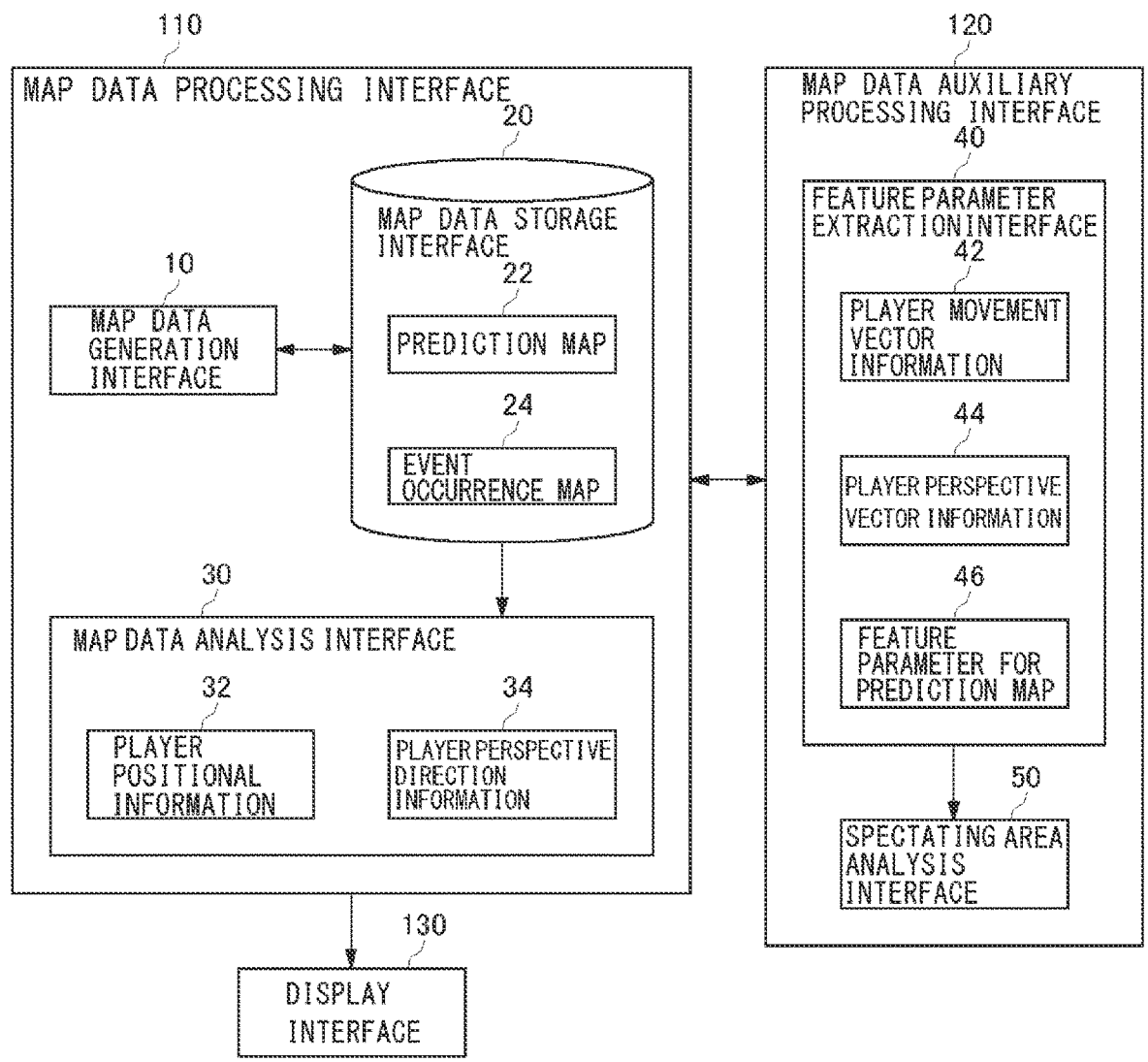
FIG. 5 shows a configuration of a spectating support apparatus for live broadcasting.

FIG. 5 shows a configuration of a spectating support apparatus 100 for live broadcasting. For live broadcasting, the map data generation unit 10 generates a prediction map 22 and an event occurrence map 24 based on the analysis result in the spectating area analysis unit 50. The prediction map 22 and the event occurrence map 24 may be displayed in the form of a heat map as shown in FIG. 2 or displayed in the form of a list of thumbnail movies as shown in FIG. 3.

The prediction map 22 is generated by analyzing a feature parameter for which the future state is predictable or easy to predict or a feature parameter that does not vary over time.

Feature parameters for which the future state is predictable or easy to predict include, for example:
Player-to-player distance
Player concentration
Number of spectators in spectator perspective Feature parameters that do not vary over time include parameters linked to the player characteristic as exemplified by:
Star player
Player engaged in a special play In order to generate a feature parameter for a prediction map by using these feature parameters, the feature parameter extraction unit 40 calculates a player movement vector information 42 by calculating a difference in player positional information 32 on a player between the current point of time and a past point of time going back from the current point of time by a predetermined time. The feature parameter extraction unit 40 calculates player perspective vector information 44 by calculating a difference in player perspective direction information 34 on the player between the current point of time and the past point of time.

The feature parameter extraction unit 40 uses the player movement vector information 42 and the player perspective vector information 44 to predict variation in the feature parameter and generate a feature parameter for a prediction map 46. When the movement vector of a given player approximates the position of another player, for example, a future player-to-player distance is predicted based on the movement vector. When the perspective vector of a player is oriented toward another player, the value of the feature parameter indicating the level of interest in the player to which the perspective is oriented is increased. When it is predicted, based on the predicted player-to-player distance information, that the distance will be equal to or smaller than a predetermined threshold value, or when it is predicted, based on the movement vector information or the player-to-player distance information on each player, that the player concentration will be increased, it may be determined that the probability of occurrence of a battle will be increased.

How far the system should go back in time to use the parameter at the past point of time may be determined as desired by the system operator or the spectator.

The spectating area analysis unit 50 predicts one or more areas in the map that should be viewed by spectators based on the predicted positional information on each player and the feature parameter for a prediction map 46.

The spectating area analysis unit 50 may predict the likelihood of a hot area and a point of time when the area will be a hot area, by determining whether the predictable feature parameter or the easily-predictable feature parameter exceeds a predetermined threshold value, by determining at which point of time the threshold value will be exceeded, etc.

The map data generation unit 10 generates the prediction map 22 based on the predicted spectating area and saves the prediction map 22 in the map data storage unit 20.

The display unit 130 presents the predicted spectating area to the spectator by displaying the prediction map 22 in the form of a predicted heat map or a list of thumbnail movies.

The event occurrence map 24 is generated by identifying that an event has occurred based on the feature parameter.

Feature parameters used by the event occurrence map 24 and indicating that an event has occurred include:
Consumption of main weapons
Consumption of sub-weapons
Players approximating a game-over condition These feature parameters indicating that a certain event has occurred will be referred to as event occurrence feature parameters. The feature parameter extraction unit 40 analyzes the feature parameters and extracts event occurrence feature parameters. Event occurrence feature parameters are parameters related to an action for the purpose of meeting a win condition or a loss condition in the game. Therefore, it is highly likely that the event occurrence map 24, which uses these feature parameters, presents a "must-see scene" more properly than the prediction map 22.

How much delay is necessary to generate the event occurrence map 24 in the event of variation in the event occurrence feature parameter depends on the system performance but is desired to generate the map as promptly as possible.

Whether the variation in the event occurrence feature parameter is truly valid may be determined by defining a threshold value.

The spectating area analysis unit 50 identifies one or more areas in the map that should be viewed by spectators, based on the event occurrence feature parameter. The map data generation unit 10 generates the event occurrence map 24 based on the identified area that should be viewed by spectators and saves the event occurrence map 24 in the map data storage unit 20.

It is desired that the prediction map 22 and the event occurrence map 24 are displayed to make it possible to distinguish between prediction and actual occurrence of an event, by displaying the maps in different methods, using coloring or pattern of flashing, etc. In the case of displaying in the form of a heat map, the spectating area in the prediction map may be colored blue without flashing and bounded by a dotted line, whereas the spectating area in the event occurrence map may be colored red and flash stronger and faster so that the spectator can easily see.

Figure 6:
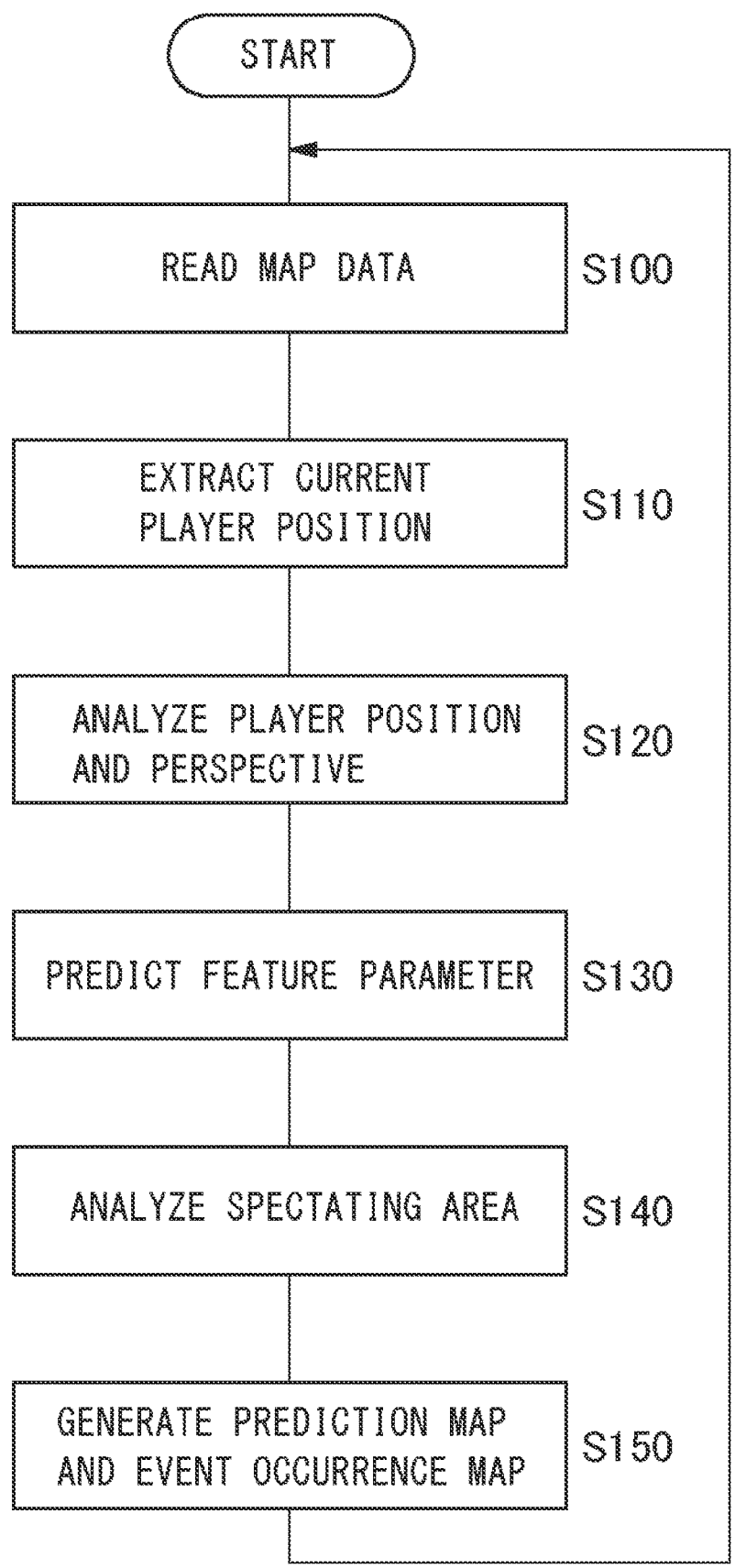
FIG. 6 is a flowchart showing a sequence of steps performed to generate map data for live broadcasting.

FIG. 6 is a flowchart showing a sequence of steps performed to generate map data for live broadcasting.

The map data generation unit 10 reads the map data from the map data storage unit 20 to gain the knowledge of the game area (S100).

The map data analysis unit 30 extracts the current position of the player's character moving in the map data (S110).

The feature parameter extraction unit 40 analyzes variation in the position and perspective of the player (S120).

The feature parameter extraction unit 40 extracts the feature parameters related to the battle situation in the game in the map and predicts variation in the feature parameters by using the movement vector and the perspective vector of the player (S130). In S130, the feature parameter extraction unit 40 may analyze the feature parameters and extracts event occurrence feature parameters.

The spectating area analysis unit 50 identifies a spectating area in which a battle is likely to take place or a battle is already taking place, based on the predicted player position and the predicted feature parameter (S140). In S140, the spectating area analysis unit 50 may use the event occurrence feature parameter.

The map data generation unit 10 generates the prediction map 22 and the event occurrence map 24 to which the spectating area is appended as auxiliary information. The map data generation unit 10 saves the resultant maps in the map data storage unit 20 (S150).

A description will now be given of a method of generating map data in the case of archive delivery. The archive data of the game represents data in which are saved parameter information additionally provided, in addition to parameter information used in real time (movement of players, use of items, etc.).

In the case the archive data merely comprises video data from the game, and parameter information is not saved, it is not possible to apply the embodiment as it is to generate map data. In the case parameter information is not saved, it would be necessary to generate parameter information manually or by using use artificial intelligence technology such as image analysis. Once parameter information is newly generated, it is possible to apply the embodiment to generate map data.

It is necessary to organize the archive data into the following categories.
(1) Data archived after applying the embodiment to the archive data and subjecting the resultant data to parameter analysis for generation of heat map data
(2) Archive data in which the parameters are saved but to which the embodiment has not been applied yet In the case of (1), the embodiment is applied to the archive data in advance, and necessary parameter analysis is performed. Archive data inclusive of parameters for generating a heat map as information is generated.

In this case, all parameters may be used to generate the prediction map 22, in contrast with the case of real time broadcasting, and the event occurrence map 24 may not be provided.

If it is desired to display the map as if in real time, however, it is possible to make it look as if the map displayed in real time by applying the method of using the parameter in real time.

In the case of (2), two methods are available depending on the power of the machine for replay. A heat map may generated by processing data as if in real time, or a heat map for the first 10-100 seconds of the replayed archive data may be generated, and the system may proceed to replay the data, performing computation and replay in parallel.

In this case, these two approaches may be changed one from the other by selection depending on the data volume involved in extraction and analysis of parameters to which the embodiment is applied, in computation, and in map generation.

Either in the case of (1) or the case of (2), it is easy to generate a predicted heat map. The system manager or the spectator may define how many seconds before a scene the map should be generated.

In the case of archive data, it is of course possible to analyze events that occur more highly precise than in real time. This is because even occurrence parameters that could not be used in real time can be used. By using event occurrence parameters, it is possible to understand a future hot area precisely and present it in a prediction map in advance.

In real time, an event occurrence parameter can be used only after the event occurs. In the case of archive data, however, it is possible to know that the event has occurred in advance so that it is possible to generate the prediction map 22 or the event occurrence map 24 that are more precise.

The actual mode of displaying the prediction map 22 or the event occurrence map 24 from archive data may be similar to that of the real time mode. In the case archive data, it is possible to show a must-see scene in advance by placing a higher weight on the prediction map 22. It is therefore desired to change to coloring or effect that makes the prediction map 22 more noticeable or attractable than the event occurrence map 24.

The above-described processes in the spectating support apparatus 100 can of course be implemented by apparatus using hardware such as a CPU and a memory and can also be implemented by firmware stored in a read-only memory (ROM), a flash memory, etc., or by software on a computer, etc. The firmware program or the software program may be made available on, for example, a computer readable recording medium. Alternatively, the program may be made available from a server via a wired or wireless network. Still alternatively, the program may be made available in the form of data broadcast over terrestrial or satellite digital broadcast systems.

As described above, according to the embodiment, the spectating area is analyzed based on feature parameters to provide the map data with an auxiliary function, which map data is fed back to the ordinary map data function to generate map data with the auxiliary function, thereby allowing a spectating area to be presented to let the spectator know the battle situation easily. This function is useful not only for spectators but also for the real time commentator. Also, the function is applicable not only to live data for the game but also to archive data. This makes it possible to present a "must-see scene" to spectators, preventing the spectators from missing a "must-see scene" in the game.

Described above is an explanation based on an exemplary embodiment. The embodiment is intended to be illustrative only and it will be understood by those skilled in the art that various modifications to combinations of constituting elements and processes are possible and that such modifications are also within the scope of the present invention.

While the embodiment has been described above by using a competitive game such as FPS/TPS as an example. The present invention is applicable to an arbitrary game (e.g., flight/chase games) in which a plurality of players compete in a three-dimensional space.

What is claimed is:

1. A spectating support apparatus comprising a processor and a memory storing a computer program, when executed by the processor, cause the processor to execute:
    a map data analysis step for referring to map data for a game in which a plurality of players compete in a three-dimensional space to extract positional information on each player and referring to the map data to extract current and past positional information and perspective information on each player;
    a feature parameter extraction step for extracting a feature parameter related to the game and using movement vector information and perspective vector information on each player in the past and up to the present to predict a feature parameter related to the game;
    a spectating area analysis step for analyzing one or more areas in a map that should be viewed by spectators, based on the positional information on each player and the feature parameter related to the game; and
    a map data generation step for generating spectating map data by associating information indicating the area that should be viewed by spectators with the map data.

2. The spectating support apparatus according to claim 1, wherein
    the feature parameter related to the game is a parameter indicating a characteristic of a player in the game or an occurrence of an event in the game.

3. The spectating support apparatus according to claim 1, wherein
    the map data generation step refers to the spectating map data to generate a heat map showing the area that should be viewed by spectators.

4. The spectating support apparatus according to claim 1, wherein
    the map data generation step generates thumbnail images of a scene in the game as viewed from a plurality of perspectives and refers to the spectating map data to generate data that highlights a thumbnail image that includes the area that should be viewed by spectators.

5. The spectating support apparatus according to claim 1, wherein
    the spectating area analysis step predicts one or more areas in a map that should be viewed by spectators based on predicted positional information on each player and the predicted feature parameter related to the game, and
    the map data generation step generates prediction map data as spectating map data by associating the predicted area that should be viewed by spectators with the map data.

6. The spectating support apparatus according to claim 1, wherein
    the spectating area analysis step identifies the area in the map that should be viewed by spectators based on a parameter indicating that an event in the game has occurred, and
    the map data generation step generates event occurrence map data as spectating map data by associating the identified area that should be viewed by spectators with the map data.

7. A spectating support method comprising:
    a map data analysis step for referring to map data for refers to map data for a game in which a plurality of players compete in a three-dimensional space to extract positional information on each player and referring to the map data to extract current and past positional information and perspective information on each player;
    a feature parameter extraction step for extracting a feature parameter related to the game and using movement vector information and perspective vector information on each player in the past and up to the present to predict a feature parameter related to the game;
    a spectating area analysis step for analyzing one or more areas in a map that should be viewed by spectators, based on the positional information on each player and the feature parameter related to the game; and
    a map data generation step for generating spectating map data by associating information indicating the area that should be viewed by spectators with the map data.

8. The spectating support method according to claim 7, wherein
    the feature parameter related to the game is a parameter indicating a characteristic of a player in the game or an occurrence of an event in the game.

9. The spectating support method according to claim 7, wherein
    the map data generation step refers to the spectating map data to generate a heat map showing the area that should be viewed by spectators.

10. The spectating support method according to claim 7, wherein
    the map data generation step generates thumbnail images of a scene in the game as viewed from a plurality of perspectives and refers to the spectating map data to generate data that highlights a thumbnail image that includes the area that should be viewed by spectators.

11. The spectating support method according to claim 7, wherein
the spectating area analysis step predicts one or more areas in a map that should be viewed by spectators based on predicted positional information on each player and the predicted feature parameter related to the game, and
the map data generation step generates prediction map data as spectating map data by associating the predicted area that should be viewed by spectators with the map data.

12. The spectating support method according to claim 7, wherein
the spectating area analysis step identifies the area in the map that should be viewed by spectators based on a parameter indicating that an event in the game has occurred, and
the map data generation step generates event occurrence map data as spectating map data by associating the identified area that should be viewed by spectators with the map data.

13. A non-transitory computer-readable medium storing executable spectating support instructions that, in response to execution, cause a computer to perform operations comprising
a map data analysis module that refers to map data for a game in which a plurality of players compete in a three-dimensional space to extract positional information on each player and refers to the map data to extract current and past positional information and perspective information on each player;
a feature parameter extraction module that extracts a feature parameter related to the game and uses movement vector information and perspective vector information on each player in the past and up to the present to predict a feature parameter related to the game;
a spectating area analysis module that analyzes one or more areas in a map that should be viewed by spectators, based on the positional information on each player and the feature parameter related to the game; and
a map data generation module that generates spectating map data by associating information indicating the area that should be viewed by spectators with the map data.

14. The recording medium according to claim 13, wherein the feature parameter related to the game is a parameter indicating a characteristic of a player in the game or an occurrence of an event in the game.

15. The recording medium according to claim 13, wherein the map data generation module refers to the spectating map data to generate a heat map showing the area that should be viewed by spectators.

16. The recording medium according to claim 13, wherein the map data generation module generates thumbnail images of a scene in the game as viewed from a plurality of perspectives and refers to the spectating map data to generate data that highlights a thumbnail image that includes the area that should be viewed by spectators.

17. The recording medium according to claim 13, wherein the spectating area analysis module predicts one or more areas in a map that should be viewed by spectators based on predicted positional information on each player and the predicted feature parameter related to the game, and
the map data generation module generates prediction map data as spectating map data by associating the predicted area that should be viewed by spectators with the map data.

18. The recording medium according to claim 13, wherein the spectating area analysis module identifies the area in the map that should be viewed by spectators based on a parameter indicating that an event in the game has occurred, and
the map data generation module generates event occurrence map data as spectating map data by associating the identified area that should be viewed by spectators with the map data.

* * * * *